US010604830B2

(12) United States Patent
Santo Rosa et al.

(10) Patent No.: US 10,604,830 B2
(45) Date of Patent: Mar. 31, 2020

(54) WIRE GUIDES FOR PLASMA TRANSFERRED WIRE ARC PROCESSES

(71) Applicant: Comau LLC, Southfield, MI (US)

(72) Inventors: Paulo Espirito Santo Rosa, Bloomfield, MI (US); David R. Collins, South Lyon, MI (US); Andrea Muzio, Bloomfield, MI (US)

(73) Assignee: Comau LLC, Southfield, MI (US)

( * ) Notice: Subject to any disclaimer, the term of this patent is extended or adjusted under 35 U.S.C. 154(b) by 237 days.

(21) Appl. No.: 15/615,294

(22) Filed: Jun. 6, 2017

(65) Prior Publication Data

US 2017/0349993 A1 Dec. 7, 2017

Related U.S. Application Data

(60) Provisional application No. 62/346,081, filed on Jun. 6, 2016.

(51) Int. Cl.

| | |
|---|---|
| ***B23K 10/00*** | (2006.01) |
| ***C23C 4/131*** | (2016.01) |
| ***H05H 1/38*** | (2006.01) |
| ***B05B 7/22*** | (2006.01) |
| ***C23C 4/08*** | (2016.01) |

(52) U.S. Cl.

CPC .............. *C23C 4/131* (2016.01); *B05B 7/224* (2013.01); *C23C 4/08* (2013.01); *H05H 1/38* (2013.01)

(58) Field of Classification Search

CPC ........... C23C 4/131; C23C 4/08; B05B 7/224; H05H 1/38

USPC .... 219/121.47, 121.48, 76.15, 76.16, 137 R, 219/137.61, 137.44

See application file for complete search history.

(56) References Cited

U.S. PATENT DOCUMENTS

| | | | | |
|---|---|---|---|---|
| 2,966,575 | A | 12/1960 | Libby | |
| 3,142,746 | A | 7/1964 | Schmerling | |
| 3,873,842 | A | 3/1975 | Thackara | |
| 4,575,612 | A | 3/1986 | Prunier | |
| 5,296,667 | A * | 3/1994 | Marantz | B05B 7/224 219/121.47 |
| 5,468,295 | A | 11/1995 | Marantz et al. | |
| 5,635,091 | A | 6/1997 | Hori et al. | |
| 5,938,944 | A * | 8/1999 | Baughman | B05B 7/224 219/121.47 |
| 6,651,843 | B2 | 11/2003 | Kowalsky et al. | |
| 6,861,101 | B1 | 3/2005 | Kowalsky et al. | |
| 6,986,471 | B1 | 1/2006 | Kowalsky et al. | |

(Continued)

FOREIGN PATENT DOCUMENTS

| | | | |
|---|---|---|---|
| DE | 102009004581 | A1 | 7/2010 |
| EP | 3069795 | A1 | 9/2016 |

(Continued)

*Primary Examiner* — Mark H Paschall

(74) *Attorney, Agent, or Firm* — Young Basile Hanlon & MacFarlane, P.C.

(57) ABSTRACT

A thermal metal spraying apparatus for applying a metal coating to a target surface. The apparatus provides a cathode, a wire feed stock having a free end, and a wire guide that directs the free end of the wire feedstock to a position for establishing and maintaining a plasma transferred wire arc between the cathode and the free end of the wire feedstock. The wire guide maintains at least three points of contact with the wire feedstock as the wire feedstock is fed through the wire guide.

20 Claims, 4 Drawing Sheets

(56) References Cited

U.S. PATENT DOCUMENTS

| | | | | |
|---|---|---|---|---|
| 7,124,960 | B2 | 10/2006 | Schach et al. | |
| 7,491,907 | B2 | 2/2009 | Kowalsky et al. | |
| 8,450,646 | B2 | 5/2013 | Ma et al. | |
| 8,581,138 | B2 * | 11/2013 | Kowalsky | B05B 7/224 219/121.47 |
| 8,629,372 | B2 | 1/2014 | Matthews et al. | |
| 9,988,703 | B2 * | 6/2018 | Cook | C23C 4/134 |
| 2006/0219801 | A1 * | 10/2006 | Haug | B05B 7/224 239/84 |
| 2009/0261081 | A1 | 10/2009 | Girold et al. | |
| 2014/0166630 | A1 * | 6/2014 | Sugimoto | H05H 1/42 219/121.47 |
| 2014/0312006 | A1 | 10/2014 | Margolies et al. | |
| 2015/0225833 | A1 | 8/2015 | Kowalsky et al. | |

FOREIGN PATENT DOCUMENTS

| | | | |
|---|---|---|---|
| JP | 2004269944 | A | 9/2004 |
| JP | 2010207709 | A | 9/2010 |
| JP | 2010285675 | A | 12/2010 |
| WO | 0108810 | A1 | 2/2001 |

* cited by examiner

WIRE GUIDES FOR PLASMA TRANSFERRED WIRE ARC PROCESSES

CROSS-REFERENCE TO RELATED APPLICATION

This application claims the benefit of U.S. Provisional Application Ser. No. 62/346,081, filed on Jun. 6, 2016.

TECHNICAL FIELD

This disclosure relates to the field of thermal or plasma metal spraying for use in applying thin films and coatings to workpieces, and in particular, wire guide apparatuses that reduce the variation in coatings produced by thermal or plasma metal spraying.

BACKGROUND

The plasma transferred wire arc ("PTWA") process is a particularly useful high-pressure plasma coating process capable of producing high-quality metallic coatings for a variety of applications, such as the coating of engine cylinder bores. In the PTWA process, a high-pressure plasma is generated in a small region of space at the exit of a plasma torch. A continuously-fed metallic wire impinges upon this region, wherein the wire is melted and atomized by the plasma. High-speed gas emerging from the plasma torch directs the molten metal toward the surface to be coated.

When feeding the wire during the PTWA process, a cylindrical wire guide on the torch head directs the wire by feeding the wire through the wire guide immediately prior to the wire being fed into the plasma jet. The positioning of the wire relative to the plasma jet is critical to the thermal spray process. Thus, the wire guide has an extremely tight tolerance relative to the outer diameter of the wire so as to strictly control the positioning of the wire relative to the plasma jet. However, even with the tight tolerance established between the wire guide and the wire, the wire guide and the wire establish a coaxial relationship which still allows the wire to float to a certain degree since there must be a sufficient amount of space between the wire and the wire guide to allow the wire to pass through the wire guide. This floating of the wire may allow the wire to move from its optimal position when entering the thermal jet of the PTWA process. Since the positioning of the wire in the thermal jet spray is critical to the quality of the PTWA process, such floating can affect the quality of the PTWA process.

SUMMARY

Disclosed herein are thermal metal spraying apparatuses and methods for applying a metal coating to a target surface. In one implementation, a thermal metal spraying apparatus includes a cathode, a wire feed stock, and a wire guide. The wire guide directs a free end of the wire feedstock to a position for establishing and maintaining a plasma transferred wire arc between the cathode and the free end of the wire feedstock. The wire guide maintains at least three points of contact with the wire feedstock as the wire feedstock is fed through the wire guide.

The at least three points of contact can comprise a first point, a second point, and a third point. The first and second points can be on a first side of the wire guide, and the third point can be on a second side of the wire guide. The second side of the wire guide can be radially opposite the first side of the wire guide relative to an axis of the wire guide. The wire feedstock can be fed through an inner bore of the wire guide.

The wire guide can include an aperture extending through a wall of the wire guide and a member that extends through the aperture into the inner bore of the wire guide. The wall can define the inner bore of the wire guide, and the aperture can be in communication with the inner bore of the wire guide. The member can bias the wire feed stock into engagement with an inner surface of the inner bore of the wire guide. The aperture can extend through a first side of the wire guide, and the wire feedstock can be biased into engagement against a second side of the wire guide. The second side of the wire guide can be radially opposite the first side of the wire guide relative to an axis of the wire guide. The member can be a leaf spring extending axially across the aperture. The member can be a ball partially disposed within the aperture. The wire guide can include a spring disposed outside of the inner bore of the wire guide. The spring can bias the ball toward the inner bore of the wire guide. The aperture can extend through a first side of the wire guide. Two of the at least three points of contact can be on a second side of the wire guide, and the second side of the wire guide is radially opposite the first side of the wire guide relative to an axis of the wire guide.

The inner bore of the wire guide can have a slight curvature formed therein that extends axially. Two of the at least three points of contact can be on a first side of the wire guide, and one of the at least three points of contact can be on a second side of the wire guide. The second side of the wire guide can be radially opposite the first side of the wire guide relative to an axis of the wire guide.

The wire guide can include a first section and a second section adjacent to and axially misaligned with the first section. The first section can be forced into engagement with the wire feedstock along a first side of the wire guide, and the second section can be forced into engagement with the wire feedstock along a second side of the wire guide. The second side of the wire guide can be radially opposite the first side of the wire guide relative to an axis of the wire guide. The wire guide can include a cutaway section that collapses around the wire feedstock to engage the wire feedstock. The cutaway section can be retained in a collapsed position by a ring.

In another implementation, a thermal metal spraying apparatus for thermally depositing molten metal from a free end of a consumable wire onto a target surface is disclosed. The thermal metal spraying apparatus includes a cathode and a wire guide that directs the free end of the consumable wire into a position for establishing and maintaining a plasma transferred wire arc between the cathode and the free end of the consumable wire. The wire guide can bias the consumable wire toward one side of the wire guide as the consumable wire is fed through the wire guide.

In yet another implementation, a method of thermally depositing molten metal onto a target surface using a thermal metal spraying apparatus is disclosed. The thermal metal spraying apparatus includes a cathode and a wire guide directing a free end of the consumable wire to a position for establishing and maintaining a plasma transferred wire arc between the cathode and the free end of the consumable wire. The method includes biasing the consumable wire toward a first side of the wire guide as the consumable wire is fed through the wire guide. At least three points of contact are maintained on the first side and the second side of the wire guide. The second side is radially opposite the first side of the wire guide relative to an axis of the wire guide.

An aperture can extend through a wall of the wire guide. The wall can define an inner bore of the wire guide, and the aperture can be in communication with the inner bore of the wire guide. At least one of a flange, a leaf spring, or a ball can extend through the aperture into the inner bore of the wire guide to bias the consumable wire into engagement with the first side of the wire guide. The consumable wire can be fed through an inner bore of the wire guide, and the inner bore of the wire guide can have a slight curvature formed therein that extends axially. A portion of the wire guide collapses or axially misaligns to bias the consumable wire into contact with the first side of the wire guide.

These and other aspects of the present disclosure are disclosed in the following detailed description of the implementations, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
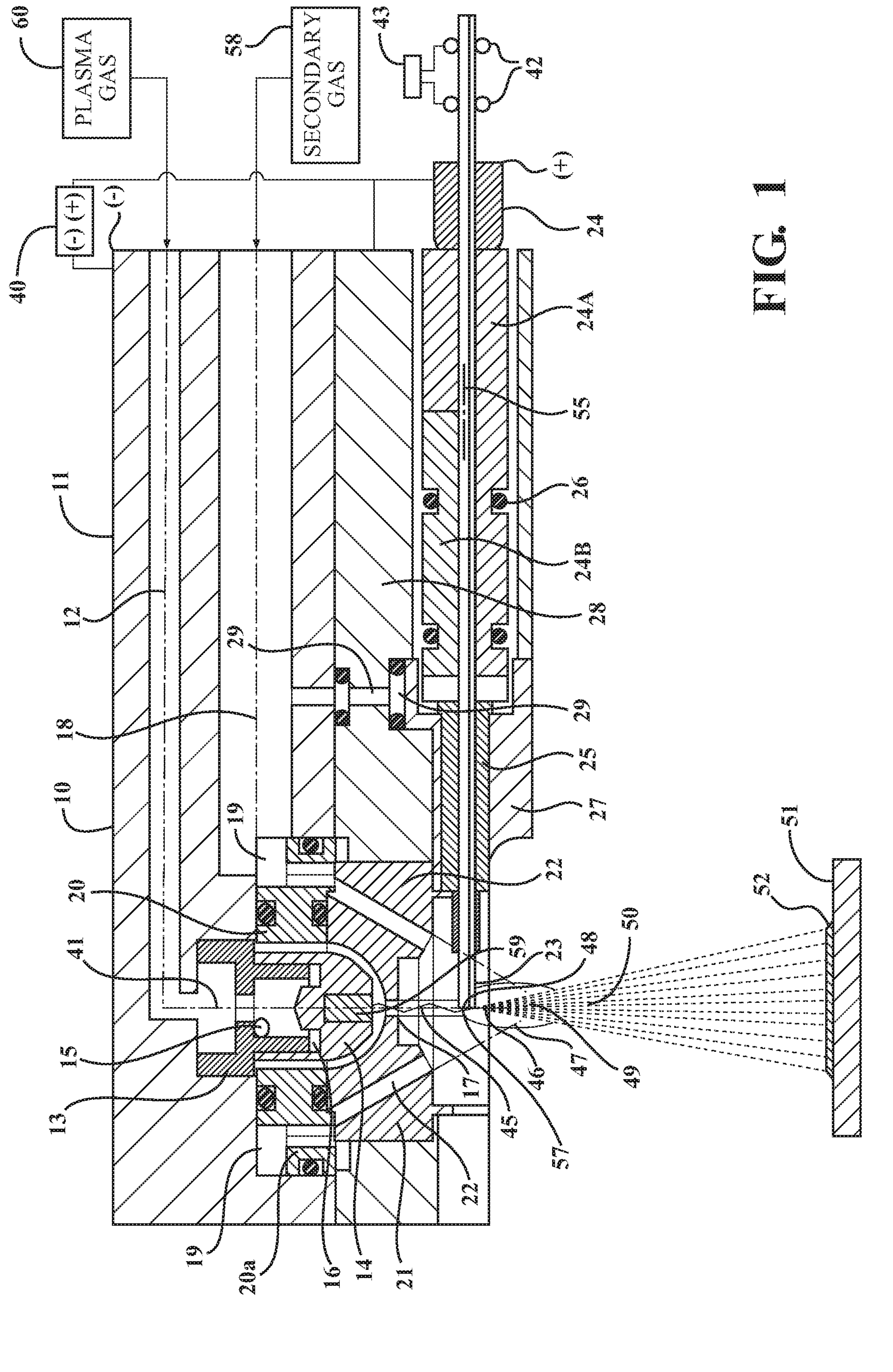
FIG. 1 is a schematic drawing showing a PTWA assembly.

FIG. 1 shows a schematic representation of a PTWA torch assembly 10 consisting of a torch body 11 containing a plasma gas port 12 and a secondary gas port 18. The torch body 11 is formed of an electrically conductive metal. A supply of plasma gas 60 is connected by means of the plasma gas port 12 to a cathode holder 13 through which the plasma gas 60 flows into the inside of a cathode assembly 14 and exits through tangential ports 15 located in the cathode holder 13. The plasma gas 60 forms a vortex flow between the outside of a cathode assembly 14 and the internal surface of a pilot plasma nozzle 16 and then exits through a constricting orifice 17. The plasma gas vortex provides substantial cooling of the heat being dissipated by the cathode function.

A supply of secondary gas 58 enters the PTWA torch assembly 10 through the secondary gas port 18, which directs the secondary gas 58 to a gas manifold 19. (The gas manifold 19 is a cavity formed between baffle plate 20 and the torch body 11, and then through bores **20*a* into another manifold 21 containing bores 22.) The secondary gas flow is uniformly distributed through the equi-angularly spaced bores 22 concentrically surrounding the outside of the constricting orifice 17. The flow of the secondary gas 58 through the equi-angularly spaced bores 22 within the pilot plasma nozzle 16 provides atomization to the molten particles, a carrier gas for the particles, cooling to the pilot plasma nozzle 16**, and a minimum disturbance to the plasma arc, which limits turbulence.

A wire feedstock 23 is fed (by wire pushing and pulling feed rollers 42, driven by a speed controlled motor 43) uniformly and constantly through a wire contact tip 24, the purpose of which is to make firm electrical contact to the wire feedstock 23 as it slides through the wire contact tip 24 along a longitudinal axis 55 of the wire feedstock 23. As shown, the wire contact tip 24 is composed of two pieces 24A, 24B held in spring or pressure load contact with the wire feedstock 23 by means of a rubber ring 26 or other suitable means. The wire contact tip 24 is fabricated from a high electrical conducting material.

As the wire feedstock 23 exits the wire contact tip 24, it enters a wire guide 25 for guiding the wire feedstock 23 into precise alignment with an axial centerline 41 of the constricting orifice 17. The wire guide 25 is supported by a wire guide block 27 contained within an insulating block 28, which provides electrical insulation between the torch body 11 (held at a negative electrical potential) and the wire contact tip 24 (held at a positive electrical potential). A small port 29 in the insulator block 28 allows a small amount of secondary gas 58 to be diverted through the wire guide block 27 in order to provide heat removal from the wire guide block 27. This can also be done by bleeding gas around or through the pilot plasma nozzle 16.

The wire guide block 27 is maintained in pressure contact with the pilot plasma nozzle 16 to provide an electrical connection between the pilot plasma nozzle 16 and the wire guide block 27. The electrical connection is made with the torch body 11, and thereby to the cathode assembly 14 (having a cathode 59), through the cathode holder 13 from the negative terminal of a power supply 40. The power supply 40 may contain both a pilot power supply and a main power supply operated through isolation contactors (not shown). A positive electrical connection is made to the wire contact tip 24 and the insulating block 28 of the PTWA torch assembly 10 from the positive terminal of the power supply 40.

The wire feedstock 23 is fed toward the axial centerline 41 of the constricting orifice 17, which is also the axis of a transferred arc 46. Concurrently, the cathode assembly 14 is electrically energized with a negative charge, and the wire feedstock 23, as well as the pilot plasma nozzle 16, although the pilot plasma nozzle 16 can be isolated, is electrically charged with a positive charge. The wire guide 25 and the wire feedstock 23 can be positioned relative to the pilot plasma nozzle 16 by many different methods, including the pilot plasma nozzle 16 having the features for holding and positioning the wire guide 25.

To initiate operation of the PTWA torch assembly 10, plasma gas 60 at an inlet gas pressure of between 50 and 140 psig is caused to flow through the plasma gas port 12, creating a vortex flow of the plasma gas 60 about an inner surface of the pilot plasma nozzle 16, and after an initial period of time of typically two seconds, high-voltage dc power or high frequency power is connected to the electrodes causing a pilot arc and pilot plasma to be momentarily activated. Additional energy is then added to the pilot arc and plasma by means of increasing the plasma arc current to the electrodes to typically between 60 and 85 amps to extend the plasma arc providing an electrical path 45 for the plasma arc to transfer from the pilot plasma nozzle 16 to the wire tip or free end 57 of the wire feedstock 23 (as shown in FIG. 2). The wire feedstock 23 is fed by means of the feed rollers 42 into the extended transferred plasma arc wherein the free end 57 of the wire feedstock 23 is melted by the intense heat of the transferred arc 46 and associated plasma 47 that surrounds the transferred arc 46. Molten metal particles 48 are formed on the free end 57 of the wire feedstock 23 and are atomized into fine particles 50 by the viscous shear force established between the high velocity, supersonic plasma jet and the initially stationary molten droplets. The molten metal particles 48 are further atomized and accelerated by the much larger mass flow of secondary gas 58 through bores 22 that converge at a location or zone 49 beyond the melting of the free end 57 of the wire feedstock 23. The fine particles 50 created from the wire feedstock 23 are propelled to a substrate surface 51 to form a deposit 52.

It has been observed that the positioning of the free end 57 of the wire feedstock 23 relative to the plasma arc is critical to the quality of the deposit 52 formed on the substrate surface 51 by the PTWA process. Previous designs have strictly controlled the positioning of the wire feedstock 23 by maintaining an extremely tight tolerance between the outer diameter of the wire feedstock 23 and the inner diameter of the wire guide 25. However, even with a tight tolerance established between the wire feedstock 23 and the wire guide 25, the wire feedstock 23 is still allowed to float to a certain degree within the wire guide 25. The floating of the wire feedstock 23 occurs because there must still be a sufficient amount of space between the wire feedstock 23 and the wire guide 25 to allow the wire feedstock 23 to be coaxially fed through the wire guide 25. The floating of the wire feedstock 23 can allow the wire feedstock 23 to move from its optimal position when entering the plasma arc.

As the result of experimentation, alternative embodiments of the wire guide 25 have been developed to address the problems created by the floating of the wire feedstock 23 within the wire guide 25. The alternative embodiments of the wire guide 25 shown in FIGS. 2-7 are designed to bias the wire feedstock 23 toward one side of the wire guide 25 to create at least three points of contact between the wire feedstock 23 and the wire guide 25, which result in decreasing or eliminating the floating that is traditionally present as described above. First and second points 101, 102 of the at least three points of contact can be on a first side 201 of the wire feedstock 23 and can be part of a continuous surface. A third point 103 of the at least three points of contact can be along a second side 202 that is radially or circumferentially opposite the first side 201 of the wire feedstock 23 relative to an axis of the wire feedstock 23.

Figure 2A:
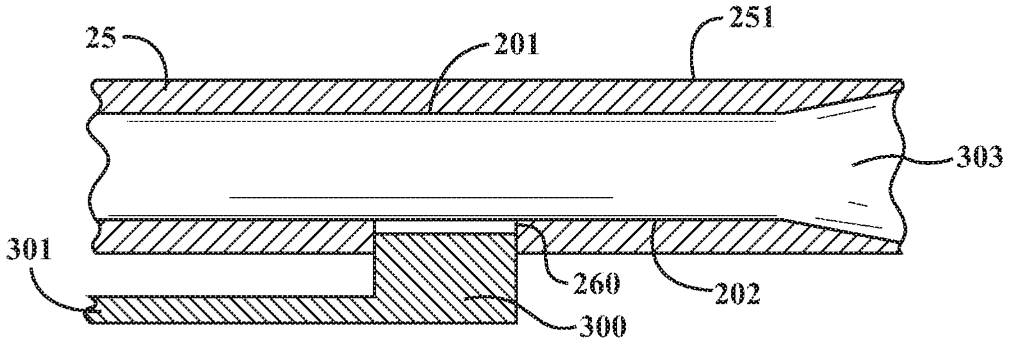
FIGS. 2A-B are schematic drawings showing a first alternative embodiment of a wire guide for the PTWA assembly.
Figure 2B:
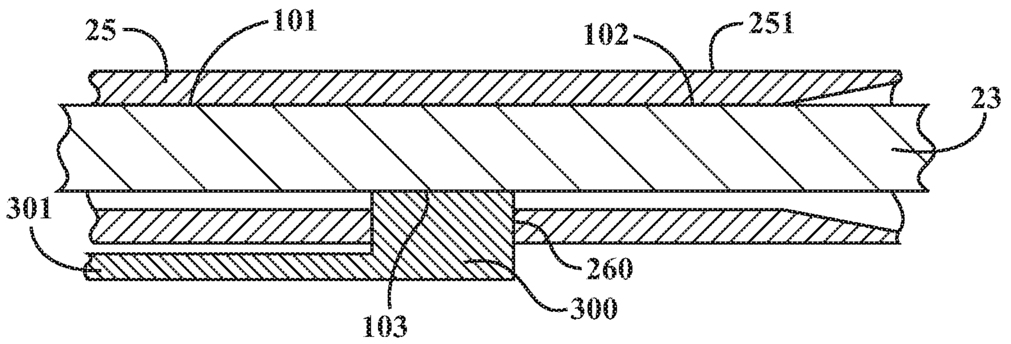

FIGS. 2A-2B show a first alternative embodiment 251 of the wire guide 25, wherein the wire guide 25 includes an aperture 260 in a wall of the wire guide 25 and a retainer 301 having a free end that is complementary to the aperture 260. The aperture 260 can be in communication with an inner bore 303 of the wire guide 25. The inner bore 303 of the wire guide 25 can be substantially straight. FIG. 2A shows no load applied to the retainer 301, and FIG. 2B shows the retainer 301 applying a load to the wire feedstock 23. The free end of the retainer 301 can have a flange 300 that is configured to fit within the aperture 260 of the wire guide 25 so that the retainer 301 may apply a load to the wire feedstock 23. The retainer 301 may be pivotally supported (not shown) by the wire guide 25 or an additional structure of the PTWA torch assembly 10, and the load from the retainer 301 can be applied either pneumatically or by a spring force. The retainer 301 can be either conductive or non-conductive.

As shown, the flange 300 of the retainer 301 extends far enough into the aperture 260 of the wire guide 25 so that the flange 300 can engage the wire feedstock 23 and bias the wire feedstock 23 against an inner surface of the wire guide 25 along the first side 201. The first and second points 101, 102 of the at least three points of contact can be along any point where the wire feedstock 23 contacts the wire guide 25 along the first side 201 of the wire guide 25. The third point 103 of the at least three points of contact can be along any point where the flange 300 of the retainer 301 of the wire guide 25 contacts the wire feedstock 23.

Figure 3A:
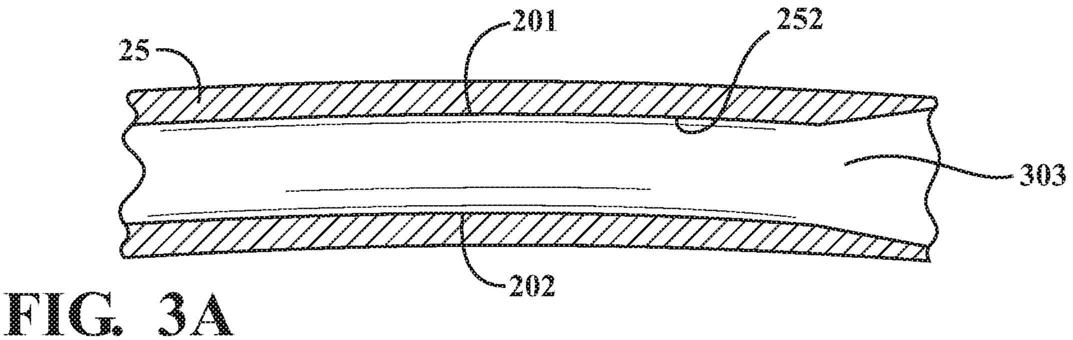
FIGS. 3A-B are schematic drawings showings a second alternative embodiment of the wire guide for the PTWA assembly.
Figure 3B:
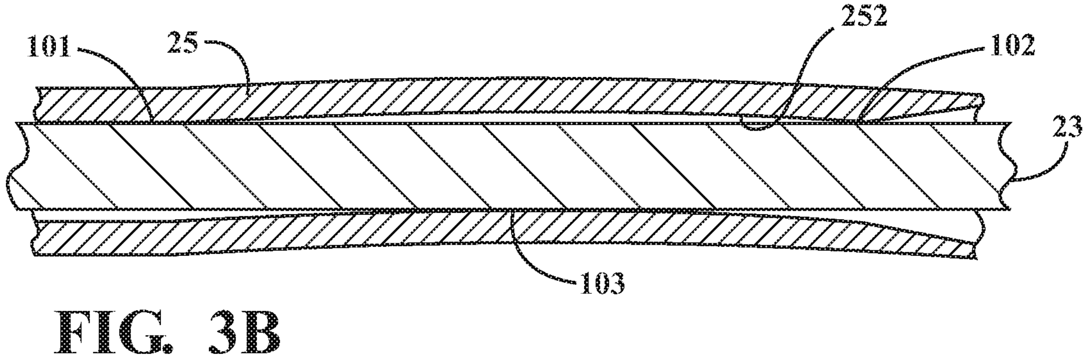

FIGS. 3A-3B show a second alternative embodiment 252 of the wire guide 25 wherein the inner bore 303 of the wire guide 25 has a slight curvature formed therein. The slight curvature can be less than 100 degrees of curvature. FIG. 3A shows the second alternative embodiment 252 of the wire guide 25 without the wire feedstock 23 extending therethrough, and FIG. 3B shows the second alternative embodiment 252 of the wire guide 25 with the wire feedstock 23 extending therethrough. The slight curvature of the inner bore 303 extends axially. As FIG. 3B illustrates, the wire feedstock 23 does not bend, as the wire feedstock 23 travels through the slightly curved inner bore 303 of the wire guide 25. As a result, the first and second points 101, 102 of the at least three points of contact can be where the wire feedstock 23 comes into contact with the first side 201 of the wire guide 25. The third point 103 of the at least three points of contact can be where the wire feedstock 23 comes into contact with the second side 202 of the wire guide 25.

Figure 4A:
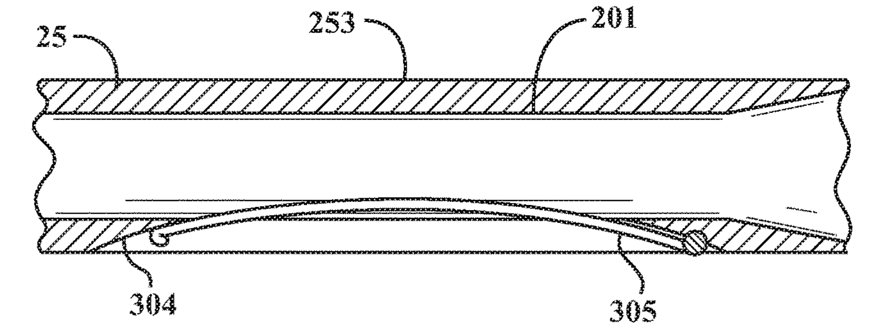
FIGS. 4A-B are schematic drawings showing a third alternative embodiment of the wire guide for the PTWA assembly.
Figure 4B:
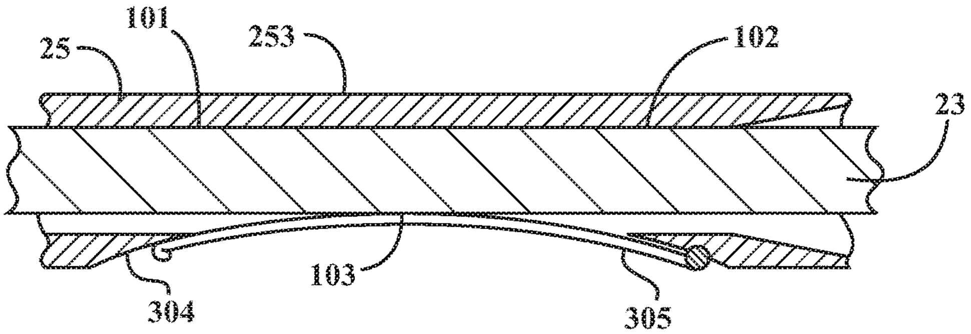

FIGS. 4A-4B show a third alternative embodiment 253 of the wire guide 25, wherein the wire guide 25 includes an aperture 304 formed in the wall of the wire guide 25 with a leaf spring 305 extending axially across the aperture 304. The aperture 304 can be in communication with the inner bore 303 of the wire guide 25. Similar to the first alternative embodiment 251 of the wire guide 25, the leaf spring 305 applies a load to the wire feedstock 23 to bias the wire feedstock 23 into engagement with the first side 201 of the inner bore 303 of the wire guide 25. FIG. 4A shows the third alternative embodiment 253 without the wire feedstock 23, and FIG. 4B shows the third alternative embodiment 253 with the wire feedstock 23 extending through the wire guide 25. The aperture 304 is configured so that the leaf spring 305 can fit within the aperture 304 and allow the leaf spring 305 to engage the wire feedstock 23. The ends of the leaf spring 305 may be connected to the wire guide 25 at each end of the aperture 304. The first and second points 101, 102 of the at least three points of contact can be along any point where the wire feedstock 23 contacts the wire guide 25 along the first side 201 of the wire guide 25. The third point 103 of the at least three points of contact can be along any point where the leaf spring 305 of the wire guide 25 contacts the wire feedstock 23.

Figure 5A:
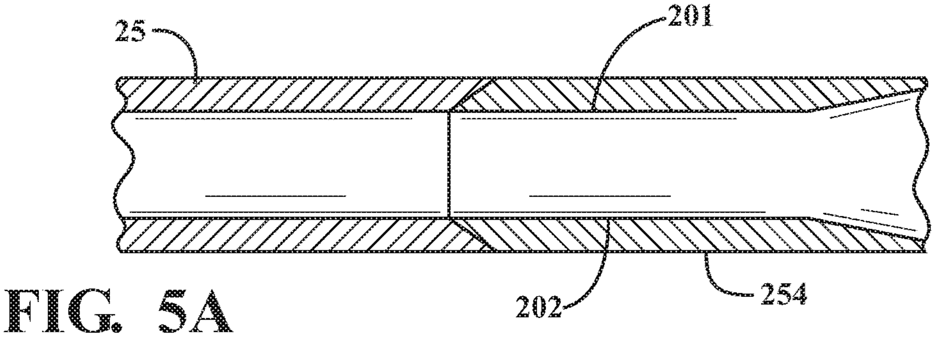
FIGS. 5A-B are schematic drawings showing a fourth alternative embodiment of the wire guide for the PTWA assembly.
Figure 5B:
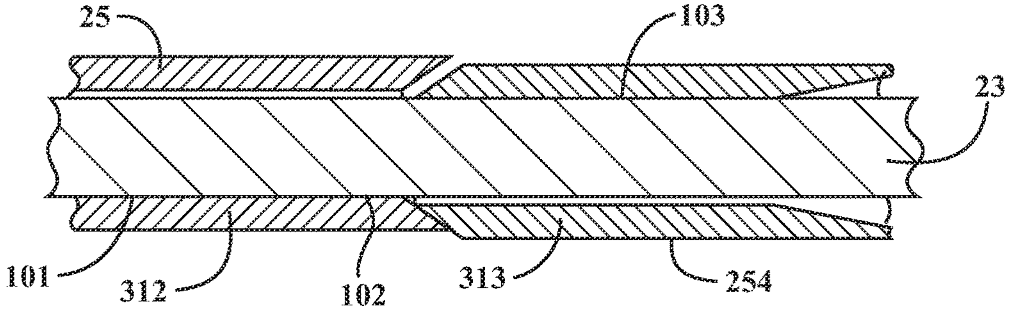

FIGS. 5A-5B show a fourth alternative embodiment 254 of the wire guide 25, where the wire guide 25 is split into a first section 312 and a second section 313 to allow a misalignment in the wire guide 25. FIG. 5A shows the fourth alternative embodiment 254 aligned without the wire feedstock 23, and FIG. 5B shows the fourth alternative embodiment 254 misaligned with the wire feedstock 23 extending through the wire guide 25. The first and second sections 312, 313 of the wire guide 25 can be angled linearly as shown or in any other configuration. When the first and second sections 312, 313 are axially misaligned, as shown in FIG.

5B, the first section 312 is forced into engagement with one side of the wire feedstock 23, and the second section 313 is forced into engagement with the other side of the wire feedstock 23. The misalignment can be performed either statically or dynamically. The misalignment of the first and second sections 312, 313 allows the wire feedstock 23 to engage several contact points on the inner bore 303 of the wire guide 25.

In the illustrated, non-limiting example, the first and second points 101, 102 of the at least three points of contact are along the second side 202 of the wire guide 25, and the third point 103 of the at least three points of contact is along the first side 201 of the wire guide 25. However, there are limitless possibilities for the points of contact along the first and second sides 201, 202 of the wire guide 25. For example, the first and second points 101, 102 of the at least three points of contact could be along the first side 201 of the wire guide 25, and the third point 103 of the at least three points of contact could be along the second side 202 of the wire guide 25.

Figure 6A:
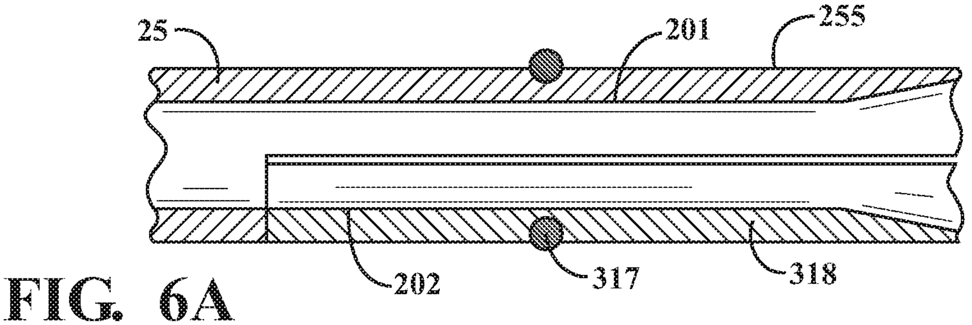
FIGS. 6A-B are schematic drawings showings a fifth alternative embodiment of the wire guide for the PTWA assembly.
Figure 6B:
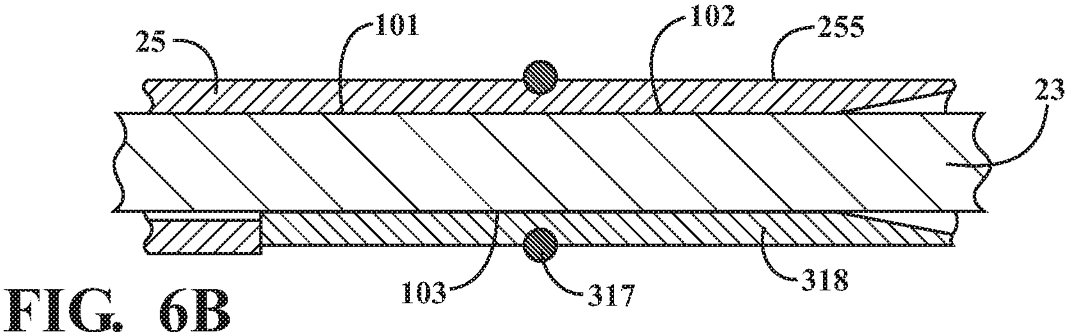

FIGS. 6A-6B show a fifth alternative embodiment 255 of the wire guide 25, wherein the wire guide 25 includes a cutaway section 318 that is cut-away from the wire guide 25. The cutaway section 318 collapses around the wire feedstock 23, which forces or biases the wire guide 25 into engagement with the wire feedstock 23. FIG. 6A shows the fifth alternative embodiment 255 uncollapsed without the wire feedstock 23, and FIG. 6B shows the fifth alternative embodiment 255 with the cutaway section 318 of the wire guide 25 collapsed around the wire feedstock 23 to create several points of contact between the wire feedstock 23 and the wire guide 25. The cutaway section 318 can be retained to the wire guide 25 by an elastomeric ring 317 or other similar mechanisms.

In the illustrated, non-limiting example, the first and second points 101, 102 of the at least three points of contact are along the first side 201 of the wire guide 25, and the third point 103 of the at least three points of contact is along the second side 202 of the wire guide 25. However, there are limitless possibilities for the points of contact along the first and second sides 201, 202 of the wire guide 25. For example, the first and second points 101, 102 of the at least three points of contact could be along the second side 202 of the wire guide 25, and the third point 103 of the at least three points of contact could be along the first side 201 of the wire guide 25.

Figure 7A:
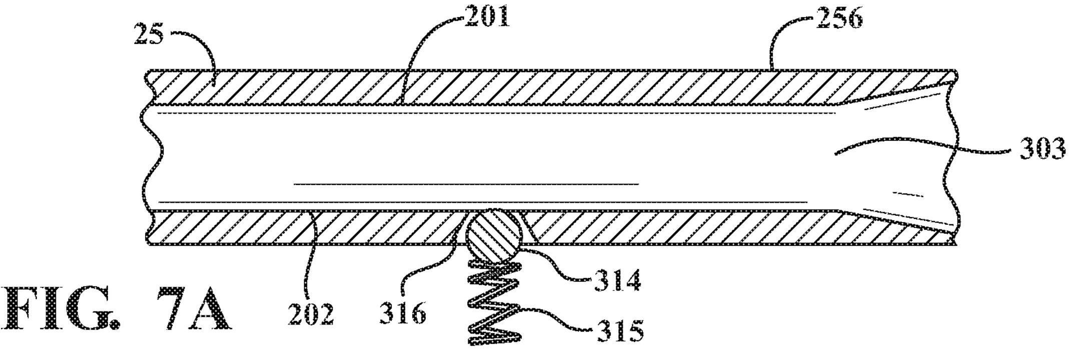
FIGS. 7A-B are schematic drawings showings a sixth alternative embodiment of the wire guide for the PTWA assembly.
Figure 7B:
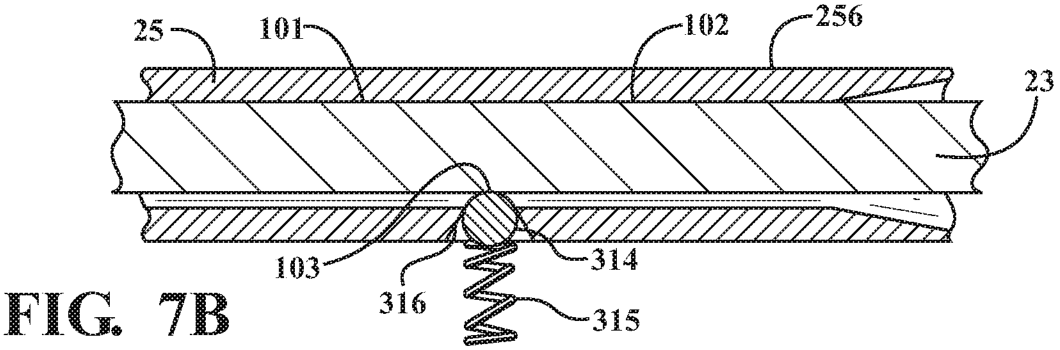

FIGS. 7A-7B show a sixth alternative embodiment 256 of the wire guide 25, wherein the wire guide 25 includes an aperture 316 extending through the wall of the wire guide 25 for receiving a spring-biased ball 314. The aperture 316 can be in communication with the inner bore 303 of the wire guide 25. The ball 314 is spring biased toward the inner bore 303 of the wire guide 25 through the use of a compression spring 315. FIG. 7A shows the sixth alternative embodiment 256 without the wire feedstock 23, and FIG. 7B shows the sixth alternative embodiment 256 with the wire feedstock 23 extending through the wire guide 25.

The aperture 316 is configured to retain the spring-biased ball 314 while also allowing the spring-biased ball 314 to engage the wire feedstock 23 when a force is applied to the ball 314 by the compression spring 315. For this to occur, the diameter of the ball 314 is slightly larger than the width or diameter of the aperture 316. When a force is applied to the ball 314 by the compression spring 315, the ball 314 emerges from the aperture 316 just far enough into the inner bore 303 of the wire guide 25 that the ball 314 engages the wire feedstock 23 to create the third point 103 of the at least three points of contact and bias the wire feedstock 23 into engagement with the first side 201 of the wire guide 25, which creates the first and second points 101, 102 of the at least three points of contact.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A thermal metal spraying apparatus for applying a metal coating to a target surface, the thermal metal spraying apparatus comprising:

a wire feedstock having a free end; and a wire guide directing the free end of the wire feedstock to a position for establishing and maintaining a plasma transferred wire arc, wherein the wire guide maintains at least three points of contact between an inner surface of the wire guide and the wire feedstock as the wire feedstock is fed through the wire guide such that the wire feedstock is eccentrically positioned within the wire guide to restrict movement of the free end of the wire feedstock.

2. The thermal metal spraying apparatus of claim 1, the at least three points of contact comprise a first point, a second point, and a third point, the first and second points are on a first side of the wire guide, the third point is on a second side of the wire guide, and the second side of the wire guide is radially opposite the first side of the wire guide relative to an axis of the wire guide.

3. The thermal metal spraying apparatus of claim 1, wherein the wire feedstock is fed through an inner bore of the wire guide.

4. The thermal metal spraying apparatus of claim 3, the wire guide further comprising:

an aperture extending through a wall of the wire guide, wherein the wall defines the inner bore of the wire guide and the aperture is in communication with the inner bore of the wire guide; and a member that extends through the aperture into the inner bore of the wire guide to bias the wire feedstock into engagement with an inner surface of the inner bore of the wire guide.

5. The thermal metal spraying apparatus of claim 4, wherein the aperture extends through a first side of the wire guide, the wire feedstock is biased into engagement against a second side of the wire guide, and the second side of the wire guide is radially opposite the first side of the wire guide relative to an axis of the wire guide.

6. The thermal metal spraying apparatus of claim 4, wherein the member is a leaf spring extending axially across the aperture.

7. The thermal metal spraying apparatus of claim 4, wherein the member is a ball partially disposed with the aperture.

8. The thermal metal spraying apparatus of claim 7, the wire guide further comprising:

a spring disposed outside the inner bore of the wire guide, wherein the spring biases the ball toward the inner bore of the wire guide.

9. The thermal metal spraying apparatus of claim 3, wherein the inner bore of the wire guide has a slight curvature formed therein that extends axially.

10. The thermal metal spraying apparatus of claim 9, wherein two of the at least three points of contact are on a first side of the wire guide, one of the at least three points of contact is on a second side of the wire guide, and the second side of the wire guide is radially opposite the first side of the wire guide relative to an axis of the wire guide.

11. The thermal metal spraying apparatus of claim 3, the wire guide further comprising:

a first section; and a second section adjacent to and axially misaligned with the first section.

12. The thermal metal spraying apparatus of claim 11, wherein the first section is forced into engagement with the wire feedstock along a first side of the wire guide, the second section is forced into engagement with the wire feedstock along a second side of the wire guide, and the second side of the wire guide is radially opposite the first side of the wire guide relative to an axis of the wire guide.

13. The thermal metal spraying apparatus of claim 3, the wire guide further comprising:

a collapsible section that is movable into engagement with the wire feedstock.

14. The thermal metal spraying apparatus of claim 13, wherein the collapsible section is retained in a collapsed position by a ring.

15. A thermal metal spraying apparatus for applying a metal coating to a target surface, the thermal metal spraying apparatus comprising:

a wire feedstock having a free end; and a wire guide directing the free end of the wire feedstock to a position for establishing and maintaining a plasma transferred wire arc, wherein the wire guide maintains at least three points of contact with the wire feedstock as the wire feedstock is fed through the wire guide and the wire feedstock is fed through an inner bore of the wire guide, the wire guide further comprising:

an aperture extending through a wall of the wire guide, wherein the wall defines the inner bore of the wire guide and the aperture is in communication with the inner bore of the wire guide;

a member that extends through the aperture into the inner bore of the wire guide to bias the wire feedstock into engagement with an inner surface of the inner bore of the wire guide, the member being a ball partially disposed with the aperture; and a spring disposed outside the inner bore of the wire guide, wherein the spring biases the ball toward the inner bore of the wire guide, wherein the aperture extends through a first side of the wire guide, one of the at least three points of contact is where the ball engages the wire feedstock, two of the at least three points of contact are on a second side of the wire guide, and the second side of the wire guide is radially opposite the first side of the wire guide relative to an axis of the wire guide.

16. A thermal metal spraying apparatus for thermally depositing molten metal from a free end of a consumable wire onto a target surface, the thermal metal spraying apparatus comprising:

a wire guide directing the free end of the consumable wire to a position for establishing and maintaining a plasma transferred wire arc, wherein the wire guide is configured such that the consumable wire extends eccentrically therethrough and is biased toward one side of the wire guide as the consumable wire is fed through the wire guide.

17. A method of thermally depositing metal onto a target surface using a thermal metal spraying apparatus, the thermal metal spraying apparatus comprising a wire guide directing a free end of a consumable wire to a position for establishing and maintaining a plasma transferred wire arc, the method comprising:

biasing the consumable wire toward a first side of the wire guide as the consumable wire is fed through the wire guide such that the consumable wire extends eccentrically within the wire guide, wherein at least three points of contact are maintained on the first side and a second side of the wire guide, and the second side is radially opposite the first side of the wire guide relative to an axis of the wire guide.

18. A method of thermally depositing metal onto a target surface using a thermal metal spraying apparatus, the thermal metal spraying apparatus comprising a wire guide directing a free end of a consumable wire to a position for establishing and maintaining a plasma transferred wire arc, the method comprising:

biasing the consumable wire toward a first side of the wire guide as the consumable wire is fed through the wire guide, wherein at least three points of contact are maintained on the first side and a second side of the wire guide, and the second side is radially opposite the first side of the wire guide relative to an axis of the wire guide, wherein an aperture extends through a wall of the wire guide, the wall defines an inner bore of the wire guide, the aperture is in communication with the inner bore of the wire guide, and at least one of a flange, a leaf spring, or a ball extends through the aperture into the inner bore of the wire guide to bias the consumable wire into engagement with the first side of the wire guide.

19. The method of claim 17, wherein the consumable wire is fed through an inner bore of the wire guide, and the inner bore of the wire guide has a slight curvature formed therein that extends axially.

20. The method of claim 17, wherein a portion of the wire guide at least one of collapses or axially misaligns to bias the consumable wire into contact with the first side of the wire guide.

* * * * *